United States Patent [19]

Åkerberg

[11] Patent Number: 4,628,152

[45] Date of Patent: Dec. 9, 1986

[54] METHOD AND APPARATUS FOR TRANSMISSION OF TELEPHONE CALLS TO A PORTABLE, WIRELESS TELEPHONE SET

[75] Inventor: Dag E. Åkerberg, S-17563 Järfälla, Sweden

[73] Assignee: Telefonaktiebolaget LM Ericsson, Stockholm, Sweden

[21] Appl. No.: 522,410

[22] Filed: Aug. 11, 1983

[51] Int. Cl.$^4$ ............................................ H04M 11/00
[52] U.S. Cl. ........................................ 379/51; 379/60; 455/33
[58] Field of Search ............................ 179/2 E-2 EC; 455/32-34, 38, 53, 54, 56, 57, 68-71, 77, 76, 62

[56] References Cited

U.S. PATENT DOCUMENTS 3,943,444 3/1976 Lundberg ............................... 455/77
4,228,319 10/1980 De Jager et al. ................... 179/2 EB
4,467,141 8/1984 Resch et al. ....................... 179/2 EA Primary Examiner—Robert G. Lev
Attorney, Agent, or Firm—Roberts, Spiecens & Cohen

[57] ABSTRACT

A method and an equipment for wireless transmission of telephone calls between a stationary unit (1) connected to a telephone set (3) at a short distance from the stationary unit provides that all pairs of units (1, 3) have access to a plurality of common duplex radio speech channels for transmission of calls, and to a common radio signalling channel for transmission of signals referring to connection and disconnection of the speech channels. The radio speech channels are assigned after adaptive channel scanning in that they are listened to before a call, and a channel selected which is idle with respect to calls. The selection of an idle channel takes place automatically with the use of radio receivers (12, 25), channel selectors (15, 28) and circuits (16, 29) incorporated in both units.

14 Claims, 8 Drawing Figures

METHOD AND APPARATUS FOR TRANSMISSION OF TELEPHONE CALLS TO A PORTABLE, WIRELESS TELEPHONE SET

FIELD OF THE INVENTION

The present invention relates to methods and equipment for the transmission of telephone calls to portable wireless telephone sets.

BACKGROUND

There are a number of simple, portable, wireless telephones already available on the market in accordance with which a portable telephone coacts with a neighbouring stationary unit which is connected to a telephone line. One radio frequency is used for transmitting speech from the stationary to the portable unit, another radio frequency being used for transmission in the opposite direction; a call normally being transmitted in full duplex. From the calling aspect, the equipment is often entirely unselective, the receivers being opened so-called squelch circuit, but equipment is also known in which some kind of selective call is used, inter alia, for reducing the risk of interception by adjoining equipment. A description of existing equipment with a single-channel wireless telephone and selective call is to be found in an article by Tsujimura, Kuwabara: Cordless Telephone System and Its Propagation Characteristics, IEEE, Trans. on Vehicular Technology, Vol. VT-26, No. 4, New York Nov. 1977, pages 367–371.

One difficulty with known wireless telephones is mutual interference between adjacent telephones. An account is given in the article mentioned above of field strengths around wireless telephones, and it is stated that from the point of view of interference the same duplex channel for a wireless telephone with a range of 20 meters cannot be planned for a city center with tower blocks at a density greater than one per $600 \times 600$ m.$^2$, i.e., 2.8 times per km$^2$. If a range of 50 m. is desired, the figure will be 0.45 times per km$^2$. If incoming and outgoing traffic together are estimated at 30 mE (milliErlang) and the probability of simultaneous use of the same channel is to be a maximum of 3%, then two subscribers in the zones of the sizes mentioned can use the same duplex radio channel.

It accordingly follows that range of 20 and 50 m. a respective number of 5.6 and 0.9 subscribers per km.$^2$ and duplex radio channel can be served. These simple systems thus function well with a few radio channels as long as the subscriber density is low. However, in a city center the possibility of offering hundreds of subscribers per km.$^2$ a portable telephone must be afforded. Hundreds of duplex channels are required for this, and radio channels are a meagre resource. Frequency planning for so many radio channels is an almost impossible task at least in part because subscribers move from one place to another and take their telephones with them.

SUMMARY OF INVENTION

From statistics in telephone traffic theory, it will be found that, for example, if each wireless telephone apparatus can be switched between 5 duplex channels, a traffic of 1.875 E (Erlangs) at a 3% congestion is obtained with the Erlang B equation. At 30 mE per subscriber there is obtained 62.5 subscribers per 5 duplex channels. If an extra duplex channel is assumed necessary as a signalling channel, there are obtained 62.5 16 or about 10 subscribers per channel. For 3 and 7 duplex channels there are respectively obtained 6 and 13.5 subscribers per channel. This may be compared with 2 subscribers per channel for the single channel system described above.

Systems with multi-channel transmitters and receivers are well-known from mobile radio and mobile telephone systems. However, in these systems, all mobile units in the same area have their traffic with a common multi-channel base station. In the common state, there is information as to idle and busy channels at every instant, which makes channel selection simple. It is the possibility of using an idle channel immediately when needed which is the principle prerequisite for the large traffic capacity per channel in multi-channel systems. An adjacent base station in the same system has another set of radio channels so that there is no interference.

The situation is different in the case of a multi-channel, wireless telephone. Each telephone only has traffic with its own "base station". Since the different stations are not connected to each other there is no coherent information as to which channels are busy or idle at a given instant. If the use of multi-channel telephones is to be enabled, channel selection must take place according to other principles than those applying to a mobile telephone system covering a town or country.

One solution to the problem of disturbance between the wireless telephone is, in accordance with the present invention, a special method for selecting a suitable radio channel for each call connection. The method is here called "adaptive channel selection".

The need of channels is reduced by 20–50 times, and the risk of interference on the same channel is reduced with the aid of the invention. Furthermore the invention dispenses with the need of frequency planning when assigning telephones. All units are identical, with the exception of a specific selective call code for each of them, which is advantageous for production and stocking.

The adaptive channel selection in accordance with the invention furthermore allows an average of 2 to 3 times shorter distance between stations transmitting with the same frequency than with the single-channel wireless telephone or with a traditional mobile radio system. This allows 4–9 times more repetitions of the same channel per km.$^2$. Furthermore, with 5+1 duplex channels adapted in accordance with the above there are obtained 10 instead of 2 subscribers in close proximity on the same channel. Together there is thus obtained 20–45 times more subscribers per channel than in earlier arranged single-channel systems.

The stationary unit in the equipment is connected to the telephone network, i.e., to an ordinary subscriber jack, and is so adapted that, seen from the telephone network side, the equipment comprising a stationary unit—wireless telephone set is equivalent to a normal telephone set with a side set.

A normal telephone set connected to the stationary unit is most often included in the equipment. The normal telephone set and the wireless telephone set are intended for alternative use.

BRIEF DESCRIPTION OF DRAWING

An example of a method and equipment in accordance with the invention will now be described in the following, with reference to the appended drawing in which.

DETAILED DESCRIPTION

Figure 1:
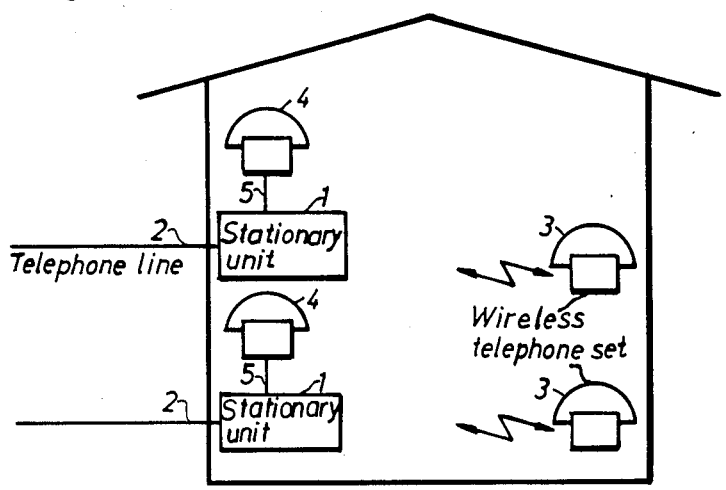
FIG. 1 illustrates the units in a wireless telephone system.

In an example of equipment with wireless telephone sets, as shown in FIG. 1, there are included two sets of apparatus each with a stationary unit 1, connected to a telephone line 2, a wireless telephone set 3 and a normal telephone set 4 connected to the stationary unit 1 by a line 5. The sets described are preferably intended for being in the same housing or office, i.e., the distance between the stationary unit 1 and the associated wireless telephone set 3 is short.

Figure 2:
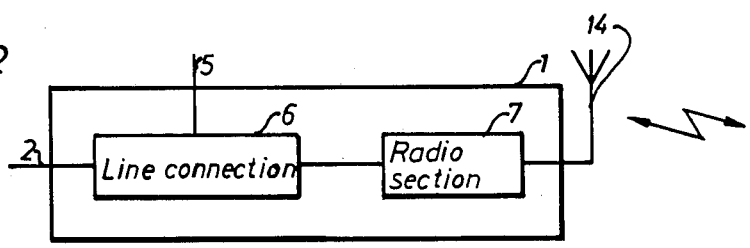
FIG. 2 illustrates the stationary unit.

In the stationary unit 1, FIG. 2, there is a line connection section 6 and a radio communication section 7, for the sake of simplicity called radio section 7 hereinafter.

The line connection section 6 contains components (not shown) including a ringing detector, circuits for sending numbers, control logic and matching circuits, conventional for telephony use and not requiring any further description.

Seen from the line side, the equipment thus functions as an ordinary telephone set with a side set.

Figure 3:
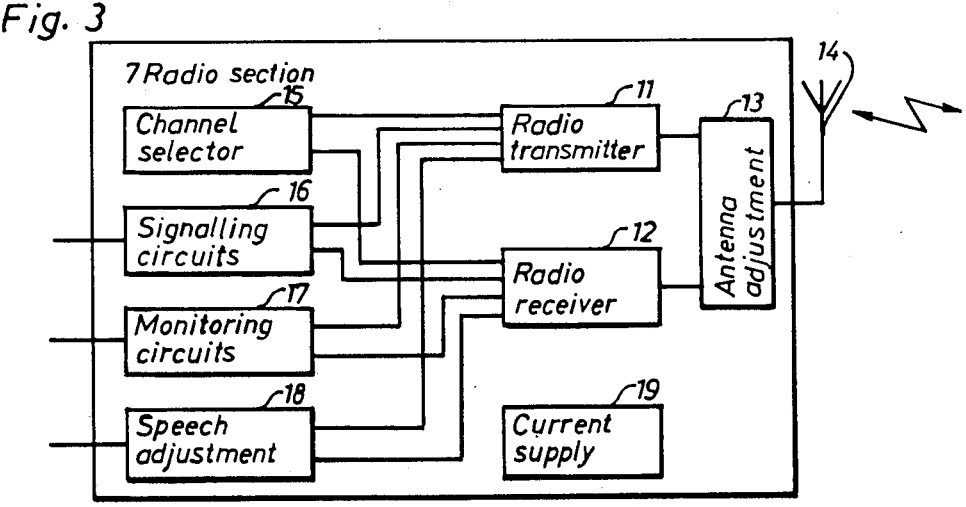
FIG. 3 illustrates the radio communication system in the stationary unit.
Figure 4:
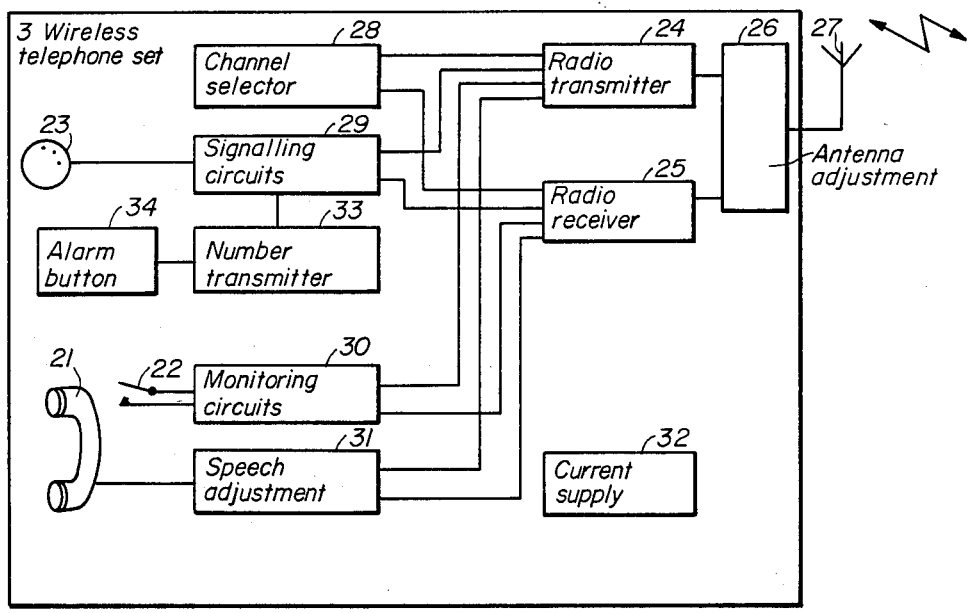
FIG. 4 illustrates the portable unit.
Figure 8:
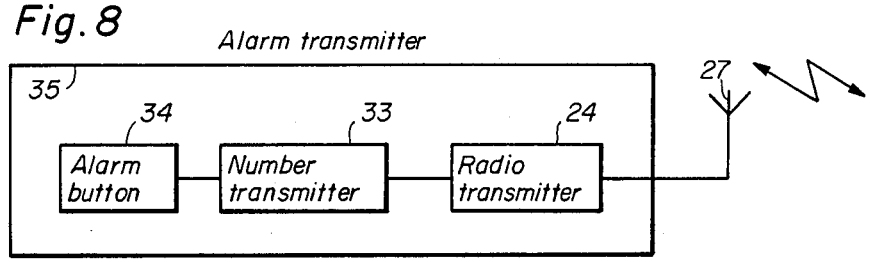
FIG. 8 illustrates an alarm transmitter.

The radio section 7, FIG. 3, includes a radio transmitter 11 and a radio receiver 12, for speech and signalling, an antenna matching circuit 13 and an antenna 14. This section furthermore includes a channel selector 15, logical circuits for signalling 16 and for monitoring 17. A speech adjustment section 18 and a current supply section 19 are also included.

The wireless telephone set 3 is portable, and is such as to function as a normal telephone set in handling, even if its appearance differs from such a set. In the set there is included a microphone and an earphone 21, the earphone also acting as an acoustic signaller for incoming calls, a cradle contact 22 and a number selector 23. Furthermore there is included a radio transmitter 24, a radio receiver 25, an antenna matching circuit 26 and an antenna 27. Also included are a channel selector 28, logical circuits for signalling 29 and monitoring 30 as well as a speech adjusting section 31 and a current supply section 32 with batteries and a number transmitter 31 with a memory for stored telephone numbers to be operated from the number selector 23 or from an alarm button 34.

The radio transmitters 11, 14 and receivers 12, 15 in the stationary and the portable equipment are adapted for switching between a plurality of duplex channels with the aid of the respective channel selectors 15, 28. The channels are a signalling channel and an optional number of radio speech channels. The channel selectors are adapted for listening to each of the speech channels to decide whether one is idle or busy and to set the transmitter and receiver to the first idle channel discovered. Such channel selectors are already described, e.g., in U.S. Pat. No. 3,943,444, and therefore require no further description.

A typical value for the time to change speech channel and decide whether it is idle or not, i.e., the channel selection time, is 30 ms.

The respective logical circuits for signalling 16, 29 are adapted for generating and detecting a selectively coded call directed to the associated set in the pair of sets. Each logical circuit is adapted for reacting to the reception of a call code distinct from all other call codes for other sets. However, both sets in an associated pair comprising a stationary unit and a wireless telephone unit may to advantage be disposed for sending and reacting to the same call code; the code is then specific for a pair of sets.

The same call code could be shared by several pairs, providing they were sufficiently geographically separated to prevent signalling between one pair also reaching another pair, but with the digital coding currently employed so many code combinations are easily obtained that such sharing is not necessary.

Means for generating and detecting coded calls or messages are described, e.g., in U.S. Pat. No. 3,835,394, and the logical circuits therefore do not need any closer description.

The logical circuits for signalling 16, 29 are also adapted for generating and detecting a message containing the number of the idle speech channel which the respective channel selector has arrived at. If no idle channel has been found, the number "0" is sent, for example. The time for sending a call code immediately followed by a message relating to the channel number is shorter than 100 ms.

In the initial situation, when the sets in a pair are idle, both their radio transmitters 11,24 are closed down, and their receivers 12,25 set for receiving on the signalling channel. Setting up a radio speech channel is initiated either by the micro telephone being lifted at the set 3 or by a ringing signal coming in on the line 2 and being received in the line connection section 6 of the stationary unit.

As an example, when connection is to be initiated in the wireless telephone set, the procedure will be as follows after the microtelephone there has been lifted:

In the wireless telephone set 3:
Scanning the speech channels by means of the radio receiver 25 and channel selector 28,
A stop at the first call channel arrived at that is found to be idle, Transmitting on the signalling channel to the stationary unit 1 its call code and the number of the idle channel.

In the stationary unit 1:
Reception on the signalling channel of the call code and the idle speech channel number,
A check by the radio receiver 12 and channel selector 15 that the given speech channel is idle at the stationary unit as well; in this case it is assumed that it is idle,
Sending on the signalling channel to the wireless set 3 of its call code and the idle channel number given previously,
Setting the transmitter 11 and receiver 12 to the given speech channel,
Simulation of lifting the receiver towards the line and connecting the line to the speech channel.

In the wireless telephone set 3:
Setting the receiver 25 for reception of the speech channel after receiving the call code and speech channel number; a connection tone then being heard as a sign that the speech channel is connected,
Selection of subscriber number.

The connection procedure is thereby completed.

When the connection is initiated from the stationary unit 1, the method of channel selection will be substantially the same, the only difference being that it is the stationary unit which begins by calling and indicating an idle channel, leading to a ringing signal in the set 3 and the latter answering whether the channel selection can be accepted.

In practice, the distance between an associated pair consisting of stationary unit and wireless telephone set is nearly always very much shorter than the distance to other pairs. Thus in nearly every case, a channel which is idle at the wireless telephone position is also idle at the stationary unit position and vice versa. If the called unit, which may either be the stationary or the portable one, cannot accept the proposed channel because it is busy, the unit searches after an idle channel and answers with the idle channel number, after which the unit calling first answers with this channel if it is idle or gives another one, and so on. As soon as the channel number suggested can be accepted by both units the call is connected. It is this searching for call channels with cooperation between the sets in a pairs which is characteristic for what has here been called "adaptive channel searching".

If, on calling by the stationary unit, all channels are found to be busy this is indicated at the wireless telephone set 3, which in this case only functions as a portable bell sending ringing signals, and then it will be necessary to go to the line-connected ordinary telephone 4 and answer. From this there appears a further advantage with the invention, namely that, in the case of all speech channels being engaged, the ringing signal is heard anyway.

If an answer is not obtained from the wireless telephone set 3, i.e., the receiver there has not been lifted, then the call is repeated from the stationary unit 1 at approximately every 5th second. Transmission of these calls should not take place synchronously with the ring signalling from the subscriber line, but should be randomly related to it. The prospect of the different stationary units sending the call codes simultaneously is thereby inhibited.

Figure 5:
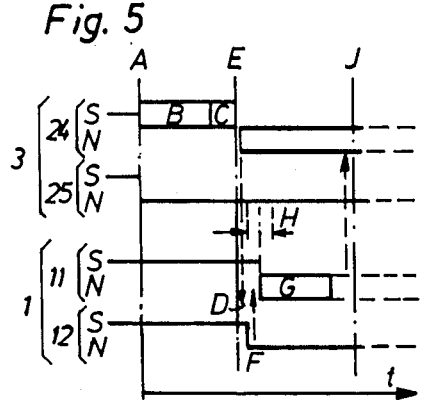
FIGS. 5, 6 and 7 illustrate time diagrams for connection procedures.

An alternative method of coupling calls is described in the following with reference to the time diagram in FIG. 5, where the following separate apparatus is denoted by numerals: Stationary unit 1 with its radio transmitter 11 and radio receiver 12, wireless telephone set 3 with its radio transmitter 24 and radio receiver 25. A line at S denotes that a unit is connected on the signalling channel and a line at N denotes that a unit is connected on one of the speech channels with channel number N. A thick line at a transmitter denotes that transmission is in progress. A vertical arrow denotes a cause-and-effect association.

Before a call begins, both transmitters 11, 24 are switched off and both receivers 12, 25 are in operation, set for receiving on the signalling channel. It is assumed that a call is begun by lifting the receiver at the wireless telephone unit 1, which takes place at A in the time diagram in FIG. 5. The coupling procedure will subsequently be:

In the wireless telephone set 3:
Scanning the speech channels by means of the radio receiver 25 and channel selector 28,
A stop at the speech channel first arrived at that is established as being idle,
Sending on the signalling channel to the stationary unit 1 of its call code B and the idle channel number C,
Continued listening on the selected speech channel,
Setting the transmitter 11 to the selected speech channel E.

In the stationary unit 1:
Reception and detection on the signalling channel of the call code and the idle speech channel number N at D,
A check by means of the radio receiver 12 and channel selector 15 that the given speech channel is idle at the stationary unit as well, in this case it is assumed that it is idle,
Continued listening F on the given call channel N,
Setting the transmitter 11 to the given speech channel and sending to the wireless unit 3 of its call code G,
Simulation of a receiver lift towards the line and connection of the line to the speech channel.

In the wireless telephone set 3:
A check that the beginning of the call code arrives in a specific time slot H, if not, the call is not accepted,
Reception on the speech channel of the call code G and the previously selected speech channel number; a dialing tone is now heard as a sign that the speech channel is connected J,
Selection of subscriber number.

The connection procedure is thereby completed.

Figure 6:
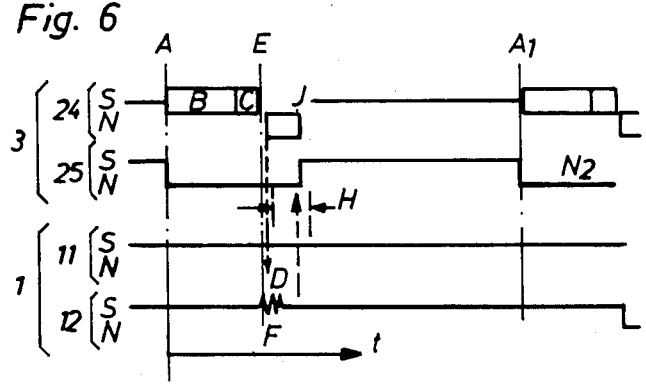

If the attempt at connection is unsuccessful, either because the speech channel selected as free by the wireless telephone set 3 is not free for the stationary unit 1 or because the selective call cannot be received and detected in the correct manner, the call is repeated as shown in FIG. 6. The connection procedure will then be as follows:

In the wireless telephone set 3:
Scanning the speech channels and sending on the signalling channel to the stationary unit 1 of its call code B and the idle channel number C in the same way as previously described in connection with FIG. 6.

In the stationary unit 1, providing that the given speech channel is busy:
No transmission and no switching in the unit takes place which would have taken place at F.

In the wireless telephone set 3:
No call has arrived in the intended time slot H. Return to listening and transmission on the signalling channels.

After a short wait the connection attempt is repeated, at $A_1$ in the diagram, now on another speech channel $N_2$. If necessary, the connection attempt is repeated several times, always on new speech channels.

In the case of the stationary unit 1 being rung up from the telephone line 2 for an incoming call, the following procedure is gone through:
Sending on the signalling channel of the selective call to the wireless telephone set 3.
Giving a ringing signal at the wireless set 3.
Lifting the receiver at the wireless set 3.

Making the connection subsequently continues in one of the ways already described until the call connection has been established.

Figure 7:
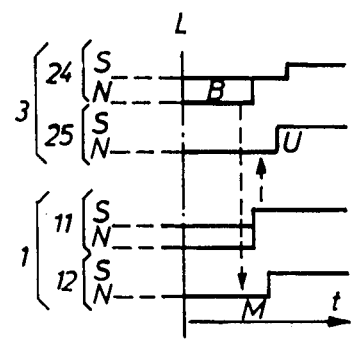

When the call is to be terminated, either on the initiative of the speaker at the wireless telephone set 3 or because the other partner has put the receiver down, disconnection is carried out in the following manner, reference now being made to the time diagram in FIG. 7:

In the wireless telephone unit 3:
  Putting down the microtelephone 21 and switching in the cradle contact 22 at L in the diagram,
  Sending on the speech channel of the stationary unit call code B.
In the stationary unit 1, after receiving the call code:
  Closing down the transmitter,
  Switching to reception M on the signalling channel,
  Simulation of call termination towards the telephone line.

In the wireless telephone unit 3:
  Sensing the transmission on the speech channel is finishing,
  Closing the transmitter,
  Switching to reception U on the signalling channel.

Disconnection of the apparatus is taken part in the call is thereby executed.

As will be seen, there is included in the disconnection a confirmation from the stationary unit 1 to the wireless telephone set 3 that the call termination is signalled to the telephone line. If this confirmation should not be received, the transmission of the call code is repeated from the wireless telephone. It is important that the telephone units are properly disconnected; the connected call can be a trunk or long distance call which has a high cost per time unit up to the time it is correctly disconnected.

A condition for the function of the adaptive channel selection is that when a speech channel has been selected the transmitters of both units must be in operation continuously during the whole of the call time. This is a prerequisite for other unit pairs to be able to detect the channel is busy.

With the described method and equipment in accordance with the invention, it will be unnecessary to plan assigning of frequencies to the wireless telephone units. All pairs comprising stationary unit and wireless telephone unit are identical with the exception of the call code, which can be assigned by means of an insertable coding module, for example.

In the "hand shaking procedure" only one signal is generally required in each direction on the signalling channel between the units. With five duplex channels and a 3% congestion there is achieved that the calling unit must on an average scan about 2 channels for 30 ms to find an idle channel. The total time for a connection will on an average then be about 60+100+30+100 ms=290 ms, ie about 0.3 seconds.

The signalling channel being common to all wireless telephones does not lead to any traffic congestion on the signalling channel, but allows direct acceptance for rapid transference of information respecting an idle speech channel and thus contributes to the rapid adaptive channel selection.

With an occupation factor of 30 mE per subscriber and an average of 2 minutes per call, 0.03/2 calls per minute are obtained. On an average a call connection thus gives an occupation on the signalling channel of about $$\frac{0.03}{2} \cdot \frac{0.3}{60} E = \frac{1}{13} mE$$

i.e., a congestion of only 1% is obtained if 13 apparatuses heavily interfere with each other on the signalling channel. In reality the local transmitter is nearly always stronger than the interfering one, and one only needs to take into account 5–10 adjoining systems which can cause blocking of the coded call. If the sending unit does not receive an answer within the expected time due to congestion on the signalling channel, the code transmission is repeated. As has been shown however, the probability of this is less than 1%.

It has been previously mentioned that an idle or busy speech channel is detected by a so-called squelch function of the radio receivers. An alternative possibility is to send a continuous subcarrier wave on a connected speech channel and detect this instead.

There is a slight risk that two adjacent pairs of units simultaneously attempt to connect on the same channel and are thereby successful. The risk is small however. The probability is small that connection takes place exactly simultaneously, and if it does take place simultaneously then the signalling is carried out simultaneously, which gives a certain probability for the connection attempt to be unsuccessful, at least for one of the pairs. The probability of the connection taking place simultaneously is very small however. For 5 speech channels the occupation will be about 0.4 E per channel at 1.875 E in total. This means that if the conversations are on an average as short as 2 minutes, then there are obtained 0.4/2=0.2 connections per minute or 1/300 per second.

If listening on the proposed channel takes place the whole time during the call procedure, the timing uncertainty with respect to simultaneousness can be limited to about 30 ms which gives a probability of less than $10^{-4}$ that connections take place on the same channel. In an alternative, the portable wireless telephone set is adapted with a button with which changing over to a new speech channel can be executed as required. In this case the telephone on the connected speech channel must once again send the call code followed by an indication of an idle channel.

Another possibility that two systems on the same channel could interfere with each other is that the portable wireless telephone set 3 is moved during the course of conversation to a position where another pair on the same frequency interferes. The probability of this is however very small, partly because each wireless unit is nearest to its own transmitter and partly because one normally stands or sits when one is talking, and if one moves, then the movement is slow and limited. If, contrary to expectations, the conversation quality is worsened during movement, then it is very natural to move back again to get the good quality.

In summary it may be mentioned that with the described invention it is possible using only 6 duplex channels, without need of individual frequency planning, to place up to about 250 wireless telephones per km.$^2$ with 50 m. range and about 1500 per km.$^2$ with a 20 m. range. This should be compared with 5.4 and 33.6 telephones, respectively, per km.$^2$ and 6 duplex channels if signal channel telephones are used, and this still on condition that there is accurate frequency planning for each telephone. If greater telephone density is desired, it can be doubled, for example, by a further 6 duplex channels being reserved for a parallel system.

The field of application of the invention is primarily portable telephones for short distances for the home or for offices with relatively few portable telephones. For offices with a high density of portable telephones it is better to use a system with other transmission media, e.g., infrared light. With 5 speech channels, 3% congestion and 30 mE traffic per telephone there could be a maximum of 62 portable telephones in accordance with the invention in an open-plan office.

To enable systems worth their price, the duplex distance should be made large, and so that the demand may be diminished on the duplex filter in the compact wireless telephone unit, the transmitter power and the receiver sensitivity should be kept low in it. In order that the adaptive channel selection shall function as well as possible, the range from the stationary unit to the wireless unit should be somewhat less than vice versa so that the person carrying the telephone naturally moves towards the transmitter if the range limit is approached.

It is important that the volume and weight of the portable, wireless telephone set 3 is kept as small as possible. A current-saving circuit can thereby decrease the requirement of large batteries. Such a circuit would be in function only when the receiver listens for a call but not during the call.

The wireless telephone set 3 is made stationary and loud-speaking in some equipment, while at the same time being made for being lifted and thereby switched to low-speaking function (see U.S. Pat. No. 3,659,050). A wireless telephone set executed in this way is also included in the term "portable wireless telephone" used in the specification.

In an alternative, the portable telephone set is replaced by more simple portable equipment with only a ringing function. In this case the stationary part only contains a code transmitter for the signalling channel, and the portable bell is in principle close to an ordinary paging receiver, which can receive a call code on the signalling channel.

In a still further alternative, the stationary unit is adapted to send a special call signal for a ringing signal on a door bell. This special signal starts a separate ringing signal in the portable telephone. Other signals such as from a fire alarm or an oven clock can also be transmitted in a similar way. Such signalling is long known in the paging systems, where a fixed station has inputs from several sources and each source releases different call codes which can all be received in the same receiver and cause the acoustic signaller therein to deliver signals with a distinguishing time pattern.

A normal telephone apparatus is most often included in the equipment, and connected to the stationary unit, the unit being adapted for breaking all radio transmission both from the stationary unit and from the portable telephone set when its microphone is lifted from the cradle. It is thus possible with the equipment including a wireless telephone to have a conversation which does not have the risk of being listened to by a radio receiver outside the equipment.

The stationary unit 1 or the wireless telephone set 3 may be provided with memories a number transmitter 33 for storing whole telephone numbers, whereby rapid selection and automatic number dialling is possible. In one development, the automatic number dialling with the aid of an alarm button 34 in the wireless telephone unit enables the execution of a light, carried alarm transmitter including a number transmitter and an alarm button arranged for coaction with the stationary unit 1.

The description hereinbefore is primarily directed to such kinds of radio transmission where modulation with analogue signals is used. In a development of the invention modulation is done with digital speech signals. Transmission in duplex is then provided by time multiplex, large and expensive duplex filters thereby being saved. The use of digital speech signals enables the introduction of ciphering of both speech signals and signals in the signalling channel.

What is claimed is:

1. A method of coupling a stationary unit, said unit being provided with a radio transmitter and a radio receiver and connected to a telephone line, with a coacting portable, wireless telephone unit provided with a radio transmitter and a radio receiver at a relatively short distance from the stationary unit, the method comprising the steps of independently searching by means of the radio receiver belonging to a first of the coacting units and a channel selector connected to said receiver for a usable radio speech channel among radio speech channels common to at least the pair of coacting units, said channels having respective numbers, and sending, on a radio signalling channel to the second of the coacting units, a coded call from the first unit and the number of the usable radio speech channel, the signalling channel being an unvarying radio signalling channel common to the pair of units.

2. A method as claimed in claim 1, comprising checking at the second of the units that the said radio speech channel searched out is usable, and completing connection of the radio speech channel, in the case of non-usable radio speech channel searching for a usable radio speech channel in the second of the units other than the first channel searched out, and sending on the radio signalling channel a coded call from the second unit and the usable radio speech channel number searched out at the second unit, the procedure being repeated until a radio speech channel has been found which is usable, as seen from both units in the pair of coacting units.

3. A method as claimed in claim 1, comprising checking at the second of the units that the said radio speech channel search out is usable, by usable channel sending on the radio speech channel search out a coded call pertaining to the first unit, as confirmation that the radio speech channel is usable, checking at the first of the units that the coded call has arrived in a fixed time slot, in which case connection is completed, the procedure being otherwise repeated after a waiting period of about 5 seconds, beginning with said first one of the units.

4. A method as claimed in claim 1, comprising beginning each transmission of signals referring to connection or disconnection of the radio speech channels by the said call being coded specifically for the intended receiver in the pair of units.

5. A method as claimed in claim 1, comprising beginning each transmission of signals referring to connection or disconnection of the radio speech channels by the said call being coded specifically for the pair of units.

6. Equipment for wireless transmission of telephone calls comprising a plurality of pairs of coacting units, each pair comprising a stationary unit, including a radio transmitter and a radio receiver and connected to a telephone line, and a coacting portable, wireless telephone unit at a short distance from the stationary unit, the portable unit including a radio transmitter, a radio receiver, an earphone, and an acoustic signaller coupled for adapting the portable telephone unit to be used for telephoning over the telephone line, the coacting units each including a set of monitoring circuits, a channel selector for independent searching for a usable radio speech channel among a plurality of radio speech channels common to the units, and further including signalling circuits in both the stationary unit and the portable telephone unit connected to the respective radio transmitter and receiver, adapted for generating and detecting signals referring to connection of the radio speech channels, exchanged between the coacting units on an unvarying radio signalling channel, the signalling channel being common to at least the pair of units in the equipment.

7. Equipment as claimed in claim 6, wherein the channel selectors are connected to the respective radio transmitters and receivers and adapted for searching out a usable radio speech channel and causing the associated radio transmitter, in coaction with the signalling circuits, to send on the radio signalling channel the number of the usable radio speech channel to the other of the coacting units.

8. Equipment as claimed in claim 6, wherein the signalling circuits include means adapted for beginning each transmission of signals referring to connection or disconnection of the radio speech channel with a call, coded specifically for the intended receiver in the pair of units.

9. Equipment as claimed in claim 6, wherein the signalling circuits include means adapted for beginning each transmission of signals referring to connection or disconnection of the radio speech channel with a call coded specifically for the pair of units.

10. Equipment as claimed in claim 6, wherein the acoustic signaller in the portable telephone unit is arranged for signalling initiated by the reception of a particular signal from the stationary unit coming from a signal source other than the telephone line.

11. Equipment as claimed in claim 6, comprising a loudspeaker for sending out the speech signals received in the portable telephone unit.

12. Equipment as claimed in claim 6, comprising a number transmitter and an alarm button on the portable telephone unit, adapted for ringing up a selected alarm telephone number in coaction with the radio transmitter of said portable telephone unit.

13. Equipment as claimed in claim 6, comprising a number transmitter, an alarm button and a radio transmitter enclosed in the portable apparatus and adapted for coaction in ringing up a selected alarm telephone number.

14. Equipment as claimed in claim 6, comprising an additional telephone means connected to said stationary unit.

* * * * *